(12) United States Patent
Zhu

(10) Patent No.: US 10,057,175 B2
(45) Date of Patent: Aug. 21, 2018

(54) METHOD AND DEVICE FOR TRANSMITTING NETWORK PACKET

(71) Applicant: Huawei Technologies Co., Ltd., Shenzhen (CN)

(72) Inventor: Guojun Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 15/053,392

(22) Filed: Feb. 25, 2016

(65) Prior Publication Data

US 2016/0173384 A1 Jun. 16, 2016

Related U.S. Application Data

(63) Continuation of application No. PCT/CN2014/078481, filed on May 27, 2014.

(30) Foreign Application Priority Data

Nov. 25, 2013 (CN) .......................... 2013 1 0607930

(51) Int. Cl.
*H04L 12/891* (2013.01)
*H04L 12/803* (2013.01)
(Continued)

(52) U.S. Cl.
CPC ........ *H04L 47/125* (2013.01); *H04L 12/6418* (2013.01); *H04L 61/2007* (2013.01);
(Continued)

(58) Field of Classification Search
CPC ....... H04L 45/22; H04L 45/24; H04L 45/245; H04L 45/28; H04L 45/304; H04L 45/306; H04L 47/6215
See application file for complete search history.

(56) References Cited

U.S. PATENT DOCUMENTS 7,783,784 B1 * 8/2010 Droux ................. H04L 41/0803
709/250
2002/0001313 A1 * 1/2002 Benayoun ............ H04L 49/602
370/466

(Continued)

FOREIGN PATENT DOCUMENTS

CN 101005445 A 7/2007
CN 101018206 A 8/2007
(Continued)

OTHER PUBLICATIONS

Foreign Communication From a Counterpart Application, European Application No. 14864209.3, Partial Supplementary European Search Report dated Jun. 23, 2016, 6 pages.

(Continued)

*Primary Examiner* — Scott M Sciacca
(74) *Attorney, Agent, or Firm* — Conley Rose, P.C.

(57) ABSTRACT

A method and a network device for transmitting a network packet. Priorities of services are differentiated, and service load sharing is performed on multiple ports according to a priority of a service and the service quality of different services is improved and user experience satisfaction is enhanced. The network device first acquires the network packet and the priority of the network packet, and sends the network packet through a network interface corresponding to the priority of the network packet, and when receiving the network packet sent by the network device, a switching device records a source port number, a source Internet Protocol (IP), a destination port number, and a destination IP of the network packet received on each physical port, and finds a physical port corresponding to a to-be-sent network packet from a record of the switching device, and sends the network packet through the physical port.

4 Claims, 7 Drawing Sheets

(51) Int. Cl.
*H04L 12/64* (2006.01)
*H04L 29/12* (2006.01)
*H04L 29/06* (2006.01)
*H04L 12/801* (2013.01)
*H04L 12/851* (2013.01)

(52) U.S. Cl.
CPC .............. *H04L 69/22* (2013.01); *H04L 47/12* (2013.01); *H04L 47/24* (2013.01); *H04L 47/2408* (2013.01)

(56) References Cited

U.S. PATENT DOCUMENTS

| | | | |
|---|---|---|---|
| 2005/0100035 A1* | 5/2005 | Chiou | H04L 45/06 370/412 |
| 2006/0153225 A1* | 7/2006 | Kamiya | H04L 49/25 370/463 |
| 2007/0008884 A1 | 1/2007 | Tang | |
| 2008/0019265 A1 | 1/2008 | Alluisi et al. | |
| 2008/0112312 A1* | 5/2008 | Hermsmeyer | H04L 45/00 370/228 |
| 2012/0275304 A1 | 11/2012 | Patel et al. | |
| 2012/0281525 A1* | 11/2012 | Addanki | H04L 49/351 370/225 |
| 2014/0198647 A1* | 7/2014 | Chowdhury | H04L 47/125 370/235 |
| 2015/0312658 A1* | 10/2015 | Winzer | H04Q 11/0005 398/5 |

FOREIGN PATENT DOCUMENTS

| | | |
|---|---|---|
| CN | 101207550 A | 6/2008 |
| CN | 101414941 A | 4/2009 |
| CN | 102148880 A | 8/2011 |
| CN | 102368736 A | 3/2012 |
| CN | 102427483 A | 4/2012 |
| CN | 103634228 A | 3/2014 |
| EP | 1965566 A2 | 9/2008 |
| EP | 2566115 A1 | 3/2013 |

OTHER PUBLICATIONS

Partial English Translation and Abstract of Chinese Patent Application No. CN101018206, Mar. 2, 2016, 6 pages.
Partial English Translation and Abstract of Chinese Patent Application No. CN102368736, Mar. 2, 2016, 5 pages.
Partial English Translation and Abstract of Chinese Patent Application No. CN103634228, Mar. 2, 2016, 4 pages.
Partial English Translation and Abstract of Chinese Patent Application No. CN101207550, May 12, 2016, 24 pages.
Partial English Translation and Abstract of Chinese Patent Application No. CN102148880, May 12, 2016, 6 pages.
Partial English Translation and Abstract of Chinese Patent Application No. CN102427483, May 15, 2016, 7 pages.
Partial English Translation and Abstract of Chinese Patent Application No. CN101414941, May 11, 2016, 11 pages.
Foreign Communication From a Counterpart Application, Chinese Application No. 201310607930.9, Chinese Office Action dated Feb. 2, 2016, 7 pages.
Foreign Communication From a Counterpart Application, PCT Application No. PCT/CN2014/078481, English Translation of International Search Report dated Sep. 3, 2014, 2 pages.
Foreign Communication From a Counterpart Application, PCT Application No. PCT/CN2014/078481, English Translation of Written Opinion dated Sep. 3, 2014, 10 pages.

* cited by examiner

METHOD AND DEVICE FOR TRANSMITTING NETWORK PACKET

CROSS-REFERENCE TO RELATED APPLICATIONS

This application is a continuation of International Application No. PCT/CN2014/078481, filed on May 27, 2014, which claims priority to Chinese Patent Application No. 201310607930.9, filed on Nov. 25, 2013, both of which are hereby incorporated by reference in their entireties.

TECHNICAL FIELD

The present disclosure relates to the computer field, and in particular, to a method and a device for transmitting a network packet.

BACKGROUND

With the development of cloud computing technologies, one physical server may be virtualized into multiple virtual machines (VMs). Each VM is equivalent to an independent computer, and has its own virtual network interface card, virtual media access control (MAC) address and virtual Internet Protocol (IP) address. Multiple VMs on a same physical server share a physical network interface on the physical server. Based on consideration of reliability and a bandwidth requirement, multiple physical network interfaces are generally configured on a server. A bonding technology is generally used for these physical network interfaces in order to improve a network throughput of a host or to improve usability, and to implement load balancing of network traffic on the multiple physical network interfaces. In addition, when a physical network interface is faulty, other physical network interfaces are responsible for a forwarding work of traffic on the network interface in order to avoid impact on normal network communication.

In the prior art, service load sharing based on a VM network interface card is implemented, but in a case in which multiple VMs run on one server, a current service load sharing manner is to mix traffic of different services together and can only implement that a service of one VM may be sent through one physical network interface. If service traffic (such as file download, online video, and the like) of a user is extremely large, port congestion may be caused, and as a result, a congested packet starts to be discarded, and an important service packet of the user may also be discarded. Therefore, a user's requirement for service quality of a service cannot be ensured, thereby causing degradation of experience.

SUMMARY

Embodiments of the present disclosure provide a method and a device for transmitting a network packet, such that load sharing can be performed on multiple ports according to a priority of a service, thereby improving service quality and enhancing user experience satisfaction when service load sharing is completed.

To achieve the foregoing objective, the following technical solutions are used in the embodiments of the present disclosure.

According to a first aspect, a method for transmitting a network packet is provided, where the method includes acquiring the network packet, acquiring a priority of the network packet according to a service type of the network packet, and sending the network packet through a first network interface corresponding to the priority of the network packet.

With reference to the first aspect, in a first possible implementation manner, the acquiring a priority of the network packet according to a service type of the network packet includes identifying the service type of the network packet according to a source port number or a destination port number of the network packet, determining the priority of the network packet according to the service type of the network packet and a preset rule, and setting, for the network packet, a priority mark corresponding to the priority of the network packet.

With reference to the first possible implementation manner of the first aspect, in a second possible implementation manner, the setting, for the network packet, a priority mark corresponding to the priority of the network packet includes setting a differentiated services code point in a type of service identifier byte in a datagram of the network packet, where a value range that is of a code value of a differentiated services code point and corresponds to a priority is preset, and a value range within which a code value of the differentiated services code point falls determines the priority of the network packet.

With reference to the first aspect, in a third possible implementation manner, a network interface corresponding to the priority of the network packet is preset, and the priority of the network packet includes at least two priorities, and each priority corresponds to one or more network interfaces.

With reference to the second possible implementation manner of the first aspect, in a fourth possible implementation manner, the sending the network packet through a first network interface corresponding to the priority of the network packet includes identifying the priority of the network packet according to the differentiated services code point in the type of service identifier byte in the datagram of the network packet, and sending the network packet through the first network interface corresponding to the priority of the network packet.

With reference to the third possible implementation manner of the first aspect, in a fifth possible implementation manner, when the first network interface corresponding to the priority of the network packet is faulty, the method further includes, if the priority of the network packet further corresponds to a second network interface, sending the network packet through the second network interface, or if the priority of the network packet corresponds to only the first network interface, or all network interfaces corresponding to the priority of the network packet are faulty, sending the network packet through a third network interface, where a priority corresponding to the third network interface is lower than the priority of the network packet.

With reference to the third possible implementation manner of the first aspect, in a sixth possible implementation manner, when the first network interface corresponding to the priority of the network packet is faulty and the priority of the network packet is a lowest priority, the method further includes, if the priority of the network packet further corresponds to a fourth network interface, sending the network packet through the fourth network interface, or if the priority of the network packet corresponds to only the first network interface, or all network interfaces corresponding to the priority of the network packet are faulty, sending the network packet through a fifth network interface, where a priority corresponding to the fifth network interface is higher than the priority of the network packet.

According to a second aspect, a method for transmitting a network packet is further provided, where the method includes, recording a source port number, a source IP, a destination port number, and a destination IP of a network packet received on each physical port; finding, according to a source IP or a destination IP of a to-be-sent network packet, a link aggregation group that is used to send the to-be-sent network packet, where the link aggregation group is a group of physical ports that are connected to a same network device; comparing a source port number and a destination port number of the to-be-sent network packet with recorded source port numbers and destination port numbers of network packets received on all physical ports in the link aggregation group to find a physical port corresponding to the to-be-sent network packet, and sending the to-be-sent network packet through the corresponding physical port.

With reference to the second aspect, in a first possible implementation manner, the comparing a source port number and a destination port number of the to-be-sent network packet with recorded source port numbers and destination port numbers of network packets received on all physical ports in the link aggregation group to find a physical port corresponding to the to-be-sent network packet includes comparing the source port number and the destination port number of the to-be-sent network packet with the recorded source port numbers and destination port numbers of the network packets received on all the physical ports in the link aggregation group, and if the source port number of the to-be-sent network packet is the same as a destination port number of a received network packet, or the destination port number of the to-be-sent network packet is the same as a source port number of a received network packet, using a physical port that receives the network packet as the physical port corresponding to the to-be-sent network packet.

With reference to the second aspect, in a second possible implementation manner, if the physical port corresponding to the to-be-sent network packet cannot be found, the method further includes, selecting any available physical port from the link aggregation group to send the to-be-sent network packet.

According to a third aspect, a network device is provided, where the network device includes, a virtual machine configured to acquire a network packet, a bridge unit configured to acquire a priority of the network packet according to a service type of the network packet, and a binding unit configured to send the network packet through a first network interface corresponding to the priority of the network packet.

With reference to the third aspect, in a first possible implementation manner, the bridge unit includes a packet analyzing unit configured to identify the service type of the network packet according to a source port number or a destination port number of the network packet, a ranking unit configured to determine the priority of the network packet according to the service type of the network packet and a preset rule, and a marking unit configured to set, for the network packet, a priority mark corresponding to the priority of the network packet.

With reference to the first possible implementation manner of the third aspect, in a second possible implementation manner, the marking unit is further configured to set a differentiated services code point in a type of service identifier byte in a datagram of the network packet, where a value range that is of a code value of a differentiated services code point and corresponds to a priority is preset, and a value range within which a code value of the differentiated services code point falls determines the priority of the network packet.

With reference to the third aspect, in a third possible implementation manner, a network interface corresponding to the priority of the network packet is preset, and the priority of the network packet includes at least two priorities, and each priority corresponds to one or more network interfaces, or multiple priorities correspond to one network interface.

With reference to the second possible implementation manner of the third aspect, in a fourth possible implementation manner, the binding unit is further configured to identify the priority of the network packet according to the differentiated services code point in the type of service identifier byte in the datagram of the network packet, and send the network packet through the first network interface corresponding to the priority of the network packet.

With reference to the third possible implementation manner of the third aspect, in a fifth possible implementation manner, when the first network interface corresponding to the priority of the network packet is faulty, the binding unit is further configured to, if the priority of the network packet further corresponds to a second network interface, send the network packet through the second network interface, or if the priority of the network packet corresponds to only the first network interface, or all network interfaces corresponding to the priority of the network packet are faulty, send the network packet through a third network interface, where a priority corresponding to the third network interface is lower than the priority of the network packet.

With reference to the third possible implementation manner of the third aspect, in a sixth possible implementation manner, when the first network interface corresponding to the priority of the network packet is faulty and the priority of the network packet is a lowest priority, the binding unit is further configured to, if the priority of the network packet further corresponds to a fourth network interface, send the network packet through the fourth network interface, or if the priority of the network packet corresponds to only the first network interface, or all network interfaces corresponding to the priority of the network packet are faulty, send the network packet through a fifth network interface, where a priority corresponding to the fifth network interface is higher than the priority of the network packet.

According to a fourth aspect, a switching device is provided, where the switching device includes a recording unit configured to record a source port number, a source IP, a destination port number, and a destination IP of a network packet received on each physical port, a querying unit configured to find, according to a source IP or a destination IP of a to-be-sent network packet, a link aggregation group that is used to send the to-be-sent network packet, where the link aggregation group is a group of physical ports that are connected to a same network device, a determining unit configured to compare a source port number and a destination port number of the to-be-sent network packet with recorded source port numbers and destination port numbers of network packets received on all physical ports in the link aggregation group to find a physical port corresponding to the to-be-sent network packet, and a sending unit configured to send the to-be-sent network packet through the corresponding physical port.

With reference to the fourth aspect, in a first possible implementation manner, the determining unit is further configured to compare the source port number and the destination port number of the to-be-sent network packet with the recorded source port numbers and destination port numbers of the network packets received on all the physical ports in the link aggregation group, and if the source port number of the to-be-sent network packet is the same as a destination port number of a received network packet, or the destination port number of the to-be-sent network packet is the same as a source port number of a received network packet, use a physical port that receives the network packet as the physical port corresponding to the to-be-sent network packet.

With reference to the fourth aspect, in a second possible implementation manner, if the physical port corresponding to the to-be-sent network packet cannot be found, the sending unit is further configured to select any available physical port from the link aggregation group to send the to-be-sent network packet.

According to the method and the device for transmitting a network packet provided in the embodiments of the present disclosure, a network device first acquires a network packet, acquires a priority of the network packet according to a service type of the network packet, and sends the network packet through a first network interface corresponding to the priority of the network packet. Then, when receiving a packet sent by the network device, a switching device records a source port number, a source IP, a destination port number, and a destination IP of a network packet received on each physical port, finds, according to a source IP or a destination IP of a to-be-sent network packet, a link aggregation group that is used to send the to-be-sent network packet, compares a source port number and a destination port number of the to-be-sent network packet with recorded source port numbers and destination port numbers of network packets received on all physical ports in the link aggregation group to find a physical port corresponding to the to-be-sent network packet, and sends the to-be-sent network packet through the corresponding physical port. Priorities are differentiated for services, services with different priorities are sent through different network interfaces on a server, and services with a same priority are received or sent through a same physical port on a switch, which completes service load distribution, improves service quality of different services and enhances user experience satisfaction.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
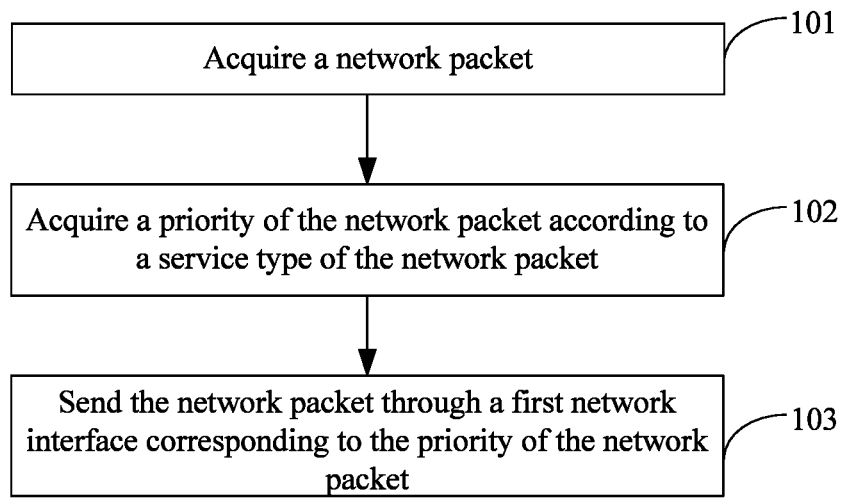
FIG. 1 is a schematic flowchart 1 of a method for transmitting a network packet according to an embodiment of the present disclosure.

An embodiment of the present disclosure provides a method for transmitting a network packet. As shown in FIG. 1, based on a network device side, the method includes the following steps.

Step 101: Acquire a network packet.

Step 102: Acquire a priority of the network packet according to a service type of the network packet.

Step 103: Send the network packet through a first network interface corresponding to the priority of the network packet.

Figure 2:
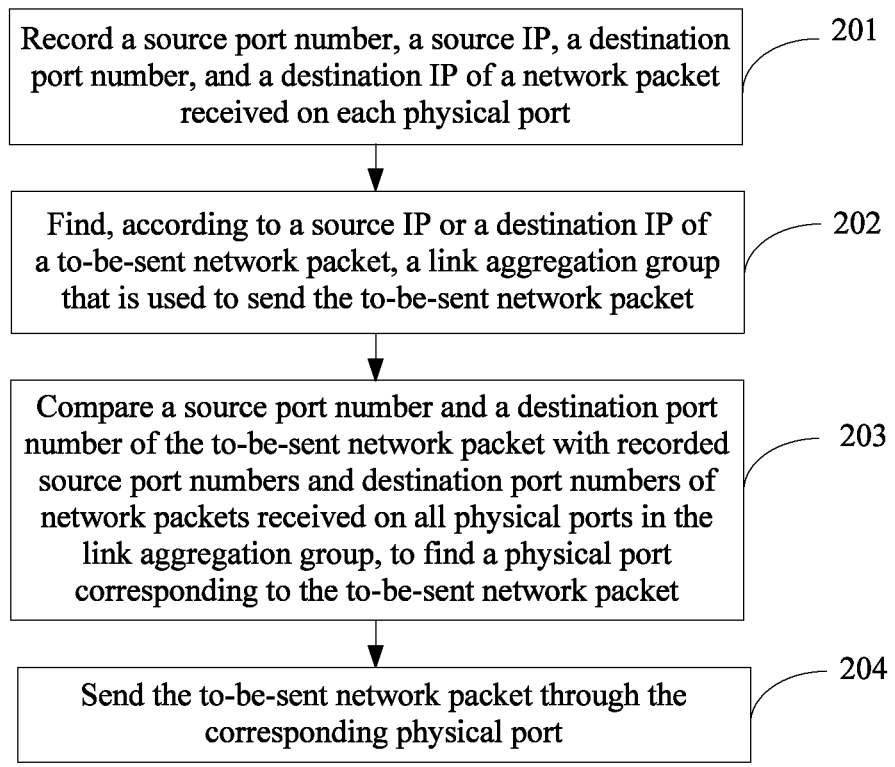
FIG. 2 is a schematic flowchart 2 of a method for transmitting a network packet according to an embodiment of the present disclosure.

An embodiment of the present disclosure further provides another method for transmitting a network packet. As shown in FIG. 2, based on a switching device side, the method includes the following steps.

Step 201: Record a source port number, a source IP, a destination port number, and a destination IP of a network packet received on each physical port.

Step 202: Find, according to a source IP or a destination IP of a to-be-sent network packet, a link aggregation group that is used to send the to-be-sent network packet.

Step 203: Compare a source port number and a destination port number of the to-be-sent network packet with recorded source port numbers and destination port numbers of network packets received on all physical ports in the link aggregation group to find a physical port corresponding to the to-be-sent network packet.

Step 204: Send the to-be-sent network packet through the corresponding physical port.

In this embodiment of the present disclosure, the network device may be a server and the switching device may be a switch.

According to the method for transmitting a network packet provided in this embodiment of the present disclosure, a network device first acquires a network packet, acquires a priority of the network packet according to a service type of the network packet, and sends the network packet through a first network interface corresponding to the priority of the network packet. Then, when receiving a packet sent by the network device, a switching device records a source port number, a source IP, a destination port number, and a destination IP of a network packet received on each physical port, finds, according to a source IP or a destination IP of a to-be-sent network packet, a link aggregation group that is used to send the to-be-sent network packet, compares a source port number and a destination port number of the to-be-sent network packet with recorded source port numbers and destination port numbers of network packets received on all physical ports in the link aggregation group to find a physical port corresponding to the to-be-sent network packet. Priorities are differentiated for services, services with different priorities are sent through different network interfaces on a server, and services with a same priority are received or sent through a same physical port on a switching device, which completes service load distribution, improves service quality of different services and enhances user experience satisfaction.

Figure 3:
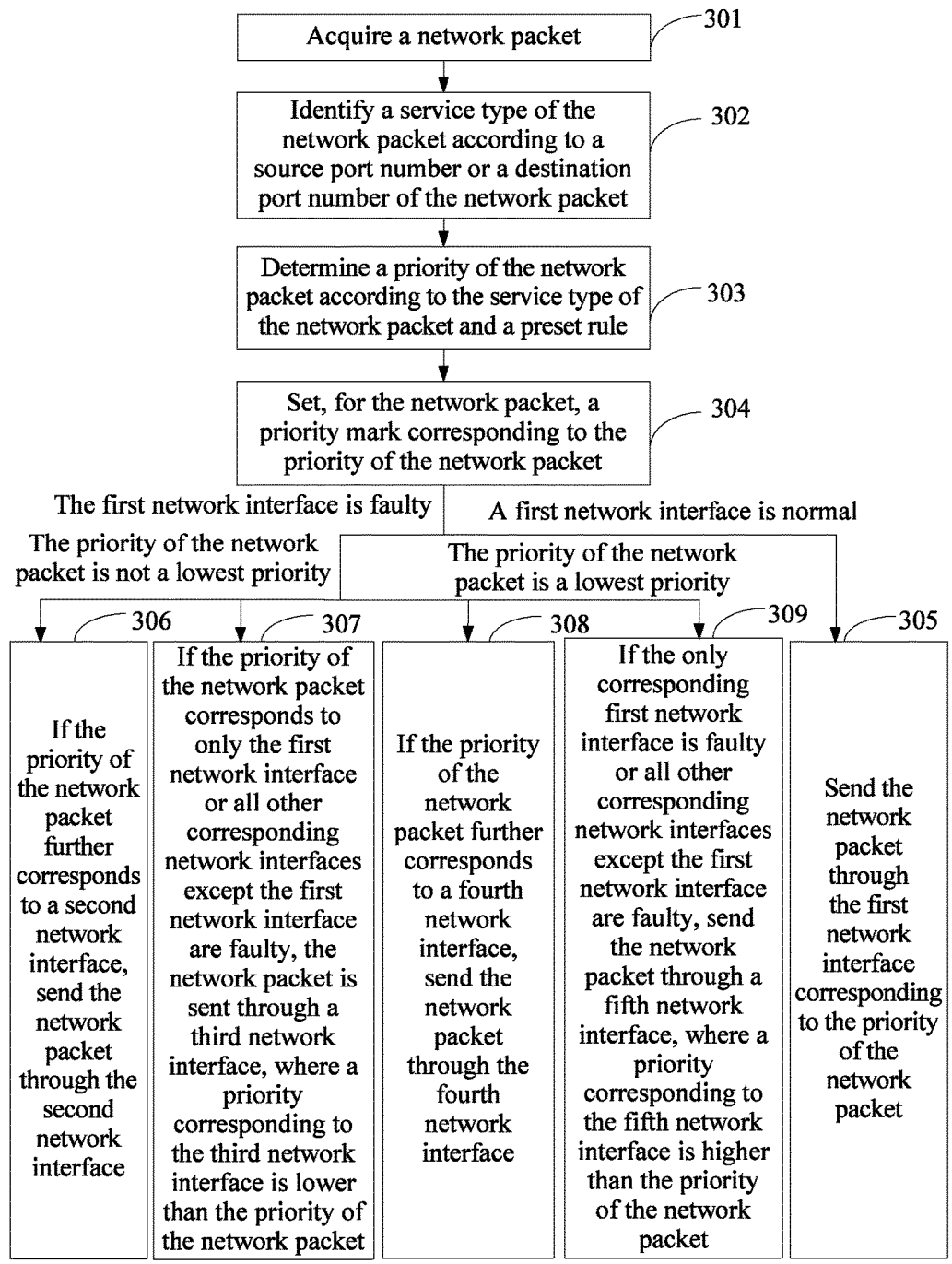
FIG. 3 is a schematic flowchart 3 of a method for transmitting a network packet according to an embodiment of the present disclosure.

To make a person skilled in the art more clearly understand the technical solutions provided in the embodiments of the present disclosure, a method for transmitting a network packet according to an embodiment of the present disclosure is described in detail in the following specific embodiments. In this embodiment, one or more VMs run on a network device, where the network device further includes a bridge unit and a binding unit. For ease of description, the virtual machine is referred to as VM in this embodiment. As shown in FIG. 3, the method includes the following steps.

Step 301: Acquire a network packet.

Exemplarily, the network packet may be generated by an application program on a VM running on the network device. After the network packet is generated, the VM sends the network packet to a bridge module in the network device.

Step 302: Identify a service type of the network packet according to a source port number or a destination port number of the network packet.

Furthermore, in an IP network, different service types are usually differentiated using different port numbers. Therefore, after receiving the network packet, the bridge module in the network device may identify, according to the source port number or the destination port number, the service type of the packet sent from the user VM.

Exemplarily, a general port number of a website WEB service is 80. A general port number of a TELNET service is 23 (a TELNET protocol is a standard protocol of an Internet remote login service), and a general port number of an independent computing architecture (ICA) protocol for desktop cloud office is 1494. It should be pointed out herein that if either of a source port number and a destination port number of different network packets is a specific port number, the different network packets are all considered to have a service type corresponding to the specific port number. For example, if a source port number of a network packet is 80 and a destination port number of the network packet is a temporary port number 1033, and a source port number of another network packet is a temporary port number 1135 and a destination port number of the another network packet is 80, service types of the two network packets are both considered to be the website WEB service.

Step 303: Determine a priority of the network packet according to the service type of the network packet and a preset rule.

Exemplarily, it may be preset that a priority of the ICA protocol for desktop cloud office is the highest, with the TELNET service taking the second place and the website WEB service taking the third place, and a service priority of another port is the lowest. Service priorities may also be differentiated according to an actual user requirement.

Therefore, after the service type of the network packet is determined, the priority of the network packet may be determined according to the foregoing preset priority rule.

Step 304: Set, for the network packet, a priority mark corresponding to the priority of the network packet.

A differentiated services code point is set in a type of service identifier byte in a datagram of the network packet, where a value range that is of a code value of a differentiated services code point and corresponds to a priority is preset, and a value range within which a code value of the differentiated services code point falls determines the priority of the network packet.

Figure 4:
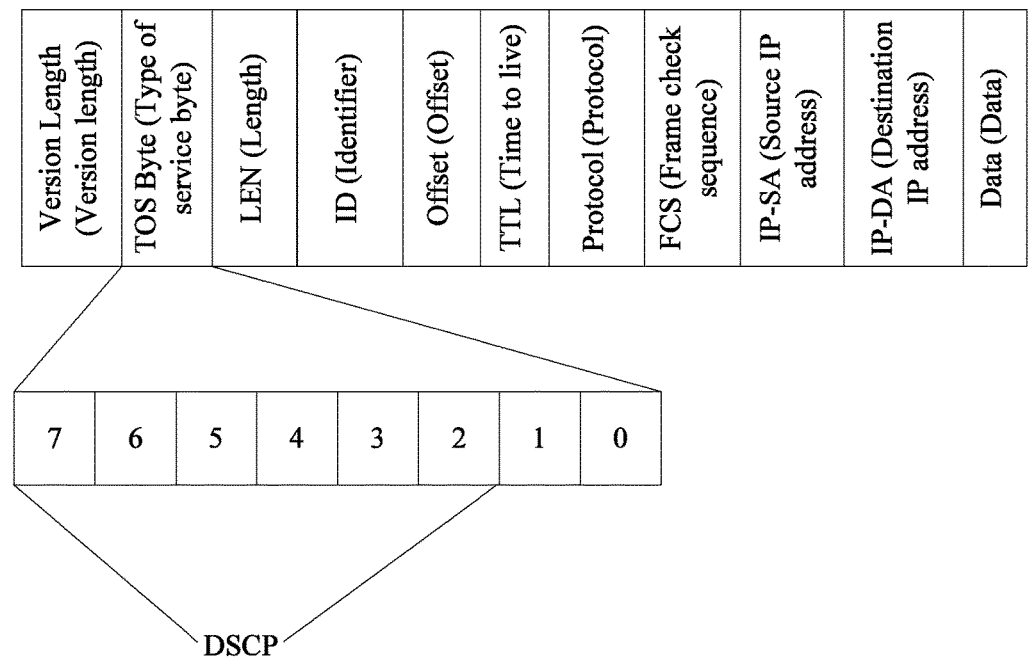
FIG. 4 is a schematic composition diagram of a network packet according to an embodiment of the present disclosure.

Exemplarily, according to a definition of request for comments (RFC) 2474, a differentiated services code point (DSCP) is set in a type of service (TOS) identifier byte of a packet. The DSCP has six bits in total, and a value range of the DSCP is 0~63. Furthermore, a location of the DSCP in the TOS of the packet is shown in FIG. 4. Different priorities may be set according to different service requirements. The priorities are classified into four types by default: Class Selector (CS), a value range of which is: 0xXXX 000, Expedited Forwarding (EF), a value range of which is: 0x101 110, Assured Forwarding (AF), a value range of which is: 0xXXX XX0, Default (BE), a value range of which is: 0x000 000. X in the value range is 0 or 1. A DSCP value of a service with a highest priority (for example the ICA protocol for desktop cloud office) is set to EF, a DSCP value range of a TELNET service is set to AF, and a DSCP value of a service with another priority is set to a default value BE. A specific mapping relationship between a different service priority and a value or a value range of a DSCP may be set according to a requirement.

After setting of the priority mark for the network packet is completed, the bridge module in the network device sends, to a binding module in the network device, the network packet that carries the priority mark.

Step 305: Send the network packet through a first network interface corresponding to the priority of the network packet, when the first network interface is normal.

After receiving the network packet that carries the priority mark, the binding module of the network device first identifies the priority of the network packet according to the DSCP in the TOS in the datagram of the network packet and then sends the network packet through the first network interface corresponding to the priority of the network packet.

A network interface corresponding to the priority of the network packet is preset by binding multiple physical network interfaces together according to a service priority. The priority of the network packet includes at least two types, and each priority corresponds to one or more network interfaces. For example, six physical network interfaces are selected, which are assumed as eth0, eth1, eth2, eth3, eth4, and eth5. The six physical network interfaces are bound to the priorities CS, EF, AF and BE, where CS corresponds to eth0 and eth1, EF corresponds to eth2, AF corresponds to eth3, and BE corresponds to eth4 and eth5.

Exemplarily, it is assumed that the DSCP of the network packet received by the binding module falls within the range of 0xXXX 000, the priority of the network packet is determined as CS, such that eth0 is used as the first network interface to send the network packet.

Step 306: If the first network interface corresponding to the priority of the network packet is faulty and the priority of the network packet further corresponds to a second network interface, send the network packet through the second network interface.

Exemplarily, it is assumed that the priority CS corresponds to eth0 and eth1, EF corresponds to eth2, AF corresponds to eth3, BE corresponds to eth4 and eth5, and the priority of the network packet is CS, when eth0 is faulty, for example congestion or disconnection, the network packet is preferentially sent through eth1 whose priority is the same as that of eth0.

Step 307: If the first network interface corresponding to the priority of the network packet is faulty and the priority of the network packet corresponds to only the first network interface, or all other corresponding network interfaces except the first network interface are faulty, the network packet is sent through a third network interface, where a priority corresponding to the third network interface is lower than the priority of the network packet.

Exemplarily, it is assumed that the priority CS corresponds to eth1, EF corresponds to eth2, AF corresponds to eth3, BE corresponds to eth4 and eth5, and the priority of the network packet is CS, when eth0 is faulty, for example congestion or disconnection, the network packet is preferentially sent through eth2 whose priority is one priority lower than that of eth1.

Alternatively, the priority CS corresponds to eth0 and eth1, EF corresponds to eth2, AF corresponds to eth3, BE corresponds to eth4 and eth5, and the priority of the network packet is CS, when eth0 and eth1 are both faulty, for example congestion or disconnection, the network packet is preferentially sent through eth2 whose priority is one priority lower than those of eth0 and eth1.

Step 308: If the priority of the network packet is the lowest and the corresponding first network interface is faulty, and the priority of the network packet further corresponds to a fourth network interface, send the network packet through the fourth network interface.

Exemplarily, it is assumed that the priority CS corresponds to eth0 and eth1, EF corresponds to eth2, AF corresponds to eth3, BE corresponds to eth4 and eth5, and the priority of the network packet is BE, it is determined that eth4 is the first network interface corresponding to the priority of the network packet. When eth4 is faulty, for example congestion or disconnection, the network packet is preferentially sent through eth5 whose priority is the same as that of eth4.

Step 309: If the priority of the network packet is the lowest, and the only corresponding first network interface is faulty or all other corresponding network interfaces except the first network interface are faulty, send the network packet through a fifth network interface, where a priority corresponding to the fifth network interface is higher than the priority of the network packet.

Furthermore, if all network interfaces corresponding to a service with a lowest priority are faulty, to avoid impact on the service caused by a network interruption, a network interface of a service with a high priority may be selected to send the service with the lowest priority in order to ensure usability of the service.

Exemplarily, it is assumed that the priority CS corresponds to eth0 and eth1, EF corresponds to eth2, AF corresponds to eth3, BE corresponds to eth4, and the priority of the network packet is BE, when eth4 is faulty, the network packet is preferentially sent through eth3 whose priority is one priority higher than that of eth4.

Alternatively, the priority CS corresponds to eth0 and eth1, EF corresponds to eth2, AF corresponds to eth3, BE corresponds to eth4 and eth5, and the priority of the network packet is BE, when eth4 and eth5 are both faulty, the network packet is preferentially sent through eth3 whose priority is one priority higher than those of eth4 and eth5.

It should be further specially noted that, if many priorities are classified for network packets, and a quantity of network interfaces is relatively small, in this case, it may be set that several lower priorities correspond to a same network interface. For example, if six priorities are classified for the network packets, but the quantity of network interfaces is only four, in this case, it may be set that network packets with a priority 5 and a priority 6 correspond to one network interface.

In addition, in this embodiment of the present disclosure, the network device may be a physical host such as a server or a computer, or an IP packet receiving unit.

According to the method for transmitting a network packet provided in this embodiment of the present disclosure, a network packet is acquired first, then a service type of the network packet is identified according to a source port number or a destination port number of the network packet, a priority of the network packet is determined according to the service type of the network packet and a preset rule, a priority mark corresponding to the priority of the network packet is set for the network packet, and finally the network packet is sent through a first network interface corresponding to the priority of the network packet. If the first network interface corresponding to the priority of the network packet is faulty and the priority of the network packet further corresponds to a second network interface, the network packet is sent through the second network interface. If the first network interface corresponding to the priority of the network packet is faulty, and the priority of the network packet corresponds to only the first network interface or all other corresponding network interfaces except the first network interface are faulty, the network packet is sent through a third network interface, where a priority corresponding to the third network interface is lower than the priority of the network packet. If the priority of the network packet is the lowest and the corresponding first network interface is faulty, and the priority of the network packet further corresponds to a fourth network interface, the network packet is sent through the fourth network interface, or if the priority of the network packet is the lowest, and the only corresponding first network interface is faulty or all other corresponding network interfaces except the first network interface are faulty, the network packet is sent through a fifth network interface, where a priority corresponding to the fifth network interface is higher than the priority of the network packet. Priorities are differentiated for services, services with different priorities are sent through different network interfaces, which completes service load distribution, improves service quality of different services and enhances user experience satisfaction.

Figure 5:
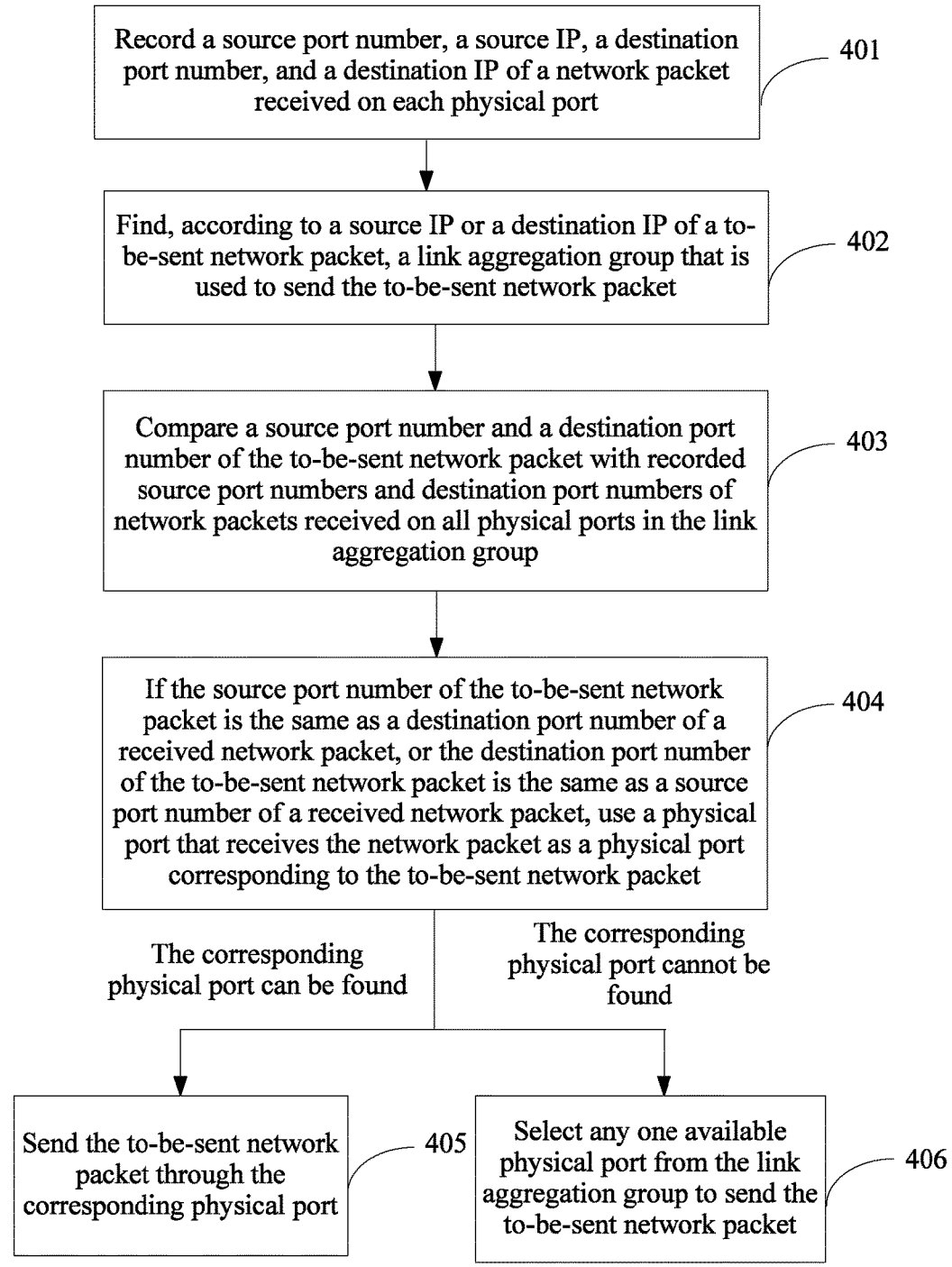
FIG. 5 is a schematic flowchart 4 of a method for transmitting a network packet according to an embodiment of the present disclosure.

An embodiment of the present disclosure further provides another method for transmitting a network packet, where the method is based on a switching device side. To make a person skilled in the art more clearly understand the technical solutions provided in the embodiments of the present disclosure, the method is described in detail in the following specific embodiments. As shown in FIG. 5, the method includes the following steps.

Step 401: Record a source port number, a source IP, a destination port number, and a destination IP of a network packet received on each physical port.

A source port number, a source IP, a destination port number, and a destination IP of a network packet received on each physical port on a switching device are recorded on the switching device.

Step 402: Find, according to a source IP or a destination IP of a to-be-sent network packet, a link aggregation group that is used to send the to-be-sent network packet.

Exemplarily, a link aggregation control protocol (LACP) is run on the switching device. Multiple ports on the switching device are aggregated together to form a link aggregation group, where the link aggregation group refers to a group of physical ports on the switching device that are connected to a same network device (for example, connected to a same physical host such as a server or a computer, or a same IP packet receiving unit). Ports on a switching device may form multiple link aggregation groups. When a network packet is to be sent, a link aggregation group that needs to be used to send the network packet is found according to a source IP and a destination IP of the network packet.

Step 403: Compare a source port number and a destination port number of the to-be-sent network packet with recorded source port numbers and destination port numbers of network packets received on all physical ports in the link aggregation group.

Step 404: If the source port number of the to-be-sent network packet is the same as a destination port number of a received network packet, or the destination port number of the to-be-sent network packet is the same as a source port number of a received network packet, use a physical port that receives the network packet as a physical port corresponding to the to-be-sent network packet.

Exemplarily, it is assumed that a source port number of a to-be-sent network packet whose service type is a website WEB service is 80 and a destination port number of the to-be-sent network packet whose service type is a website WEB service is 1020, a network packet whose service type is also the website WEB service exists in a record of the switching device, and a source port number of the network packet is 1245 and a destination port number of the network packet is 80, and the network packet is received through a physical port 1 of a switch. Therefore the physical port 1 of the switch is used as a sending port of the to-be-sent network packet.

Step 405: Send the to-be-sent network packet through the corresponding physical port, when the physical port corresponding to the to-be-sent network packet can be found.

Exemplarily, it is assumed that the to-be-sent network packet is a packet whose service type is an ICA protocol packet for desktop cloud office and a destination port number of the network packet is 1494, and then a network packet whose source port number is 1494 and whose service type is an ICA protocol for desktop cloud office is found in the record of the switching device. It is assumed that the qualified network packet is received through a physical port 2 of the switching device and through a network interface 2 connected to a server, and then the to-be-sent network packet is sent back to the server through the physical port 2 of the switching device and through the connected network interface 2. In this way, different network packets of a same service type may be sent back to a server through a same physical port on the switching device and through a network interface connected to the port and the server. In this way, it may be ensured that after a network packet is sent through a network interface of a network device, a network packet is returned through the same network interface, such that priorities of network interfaces through which network packets are sent and returned are the same, and service quality of bidirectional services is ensured.

Step 406: If the physical port corresponding to the to-be-sent network packet cannot be found, select any available physical port from the link aggregation group to send the to-be-sent network packet.

Preferably, if the physical port corresponding to the to-be-sent network packet cannot be found, a non-congested physical port in the link aggregation group is preferentially selected. Subsequently, after the physical port corresponding to the network packet can be found on the switching device, the network packet is sent through the found corresponding physical port.

In addition, in this embodiment of the present disclosure, the network device may be a physical host such as a server or a computer, or an IP packet receiving unit, and the switching device may be a switch.

According to the method for transmitting a network packet provided in this embodiment of the present disclosure, a source port number, a source IP, a destination port number, and a destination IP of a network packet received on each physical port are recorded. A link aggregation group that is used to send the to-be-sent network packet is found according to a source IP or a destination IP of the to-be-sent network packet. A source port number and a destination port number of the to-be-sent network packet are compared with recorded source port numbers and destination port numbers of network packets received on all physical ports in the link aggregation group. If the source port number of the to-be-sent network packet is the same as a destination port number of a received network packet, or the destination port number of the to-be-sent network packet is the same as a source port number of a received network packet, a physical port that receives the network packet is used as a physical port corresponding to the to-be-sent network packet, and the to-be-sent network packet is sent through the corresponding physical port, and if the physical port corresponding to the to-be-sent network packet cannot be found, any available physical port is selected from the link aggregation group to send the to-be-sent network packet. A physical port of a switching device that sends a network packet is selected according to a port number of the network packet, which completes service load distribution, improves service quality of different services and enhances user experience satisfaction.

Figure 6:
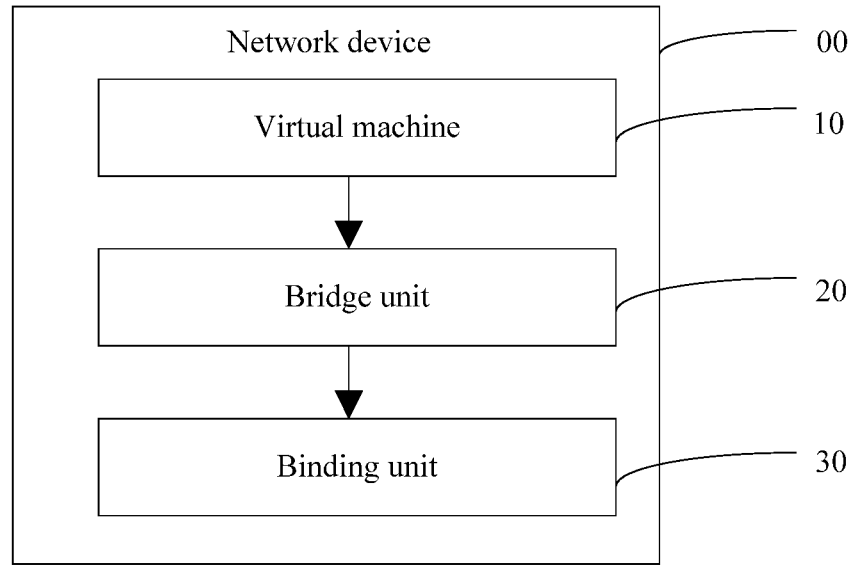
FIG. 6 is a schematic structural diagram 1 of a network device according to an embodiment of the present disclosure.

An embodiment of the present disclosure further provides a network device, and as shown in FIG. 6, the network device 00 includes a virtual machine 10 configured to acquire a network packet, a bridge unit 20 configured to acquire a priority of the network packet according to a service type of the network packet, and a binding unit 30 configured to send the network packet through a first network interface corresponding to the priority of the network packet.

Figure 7:
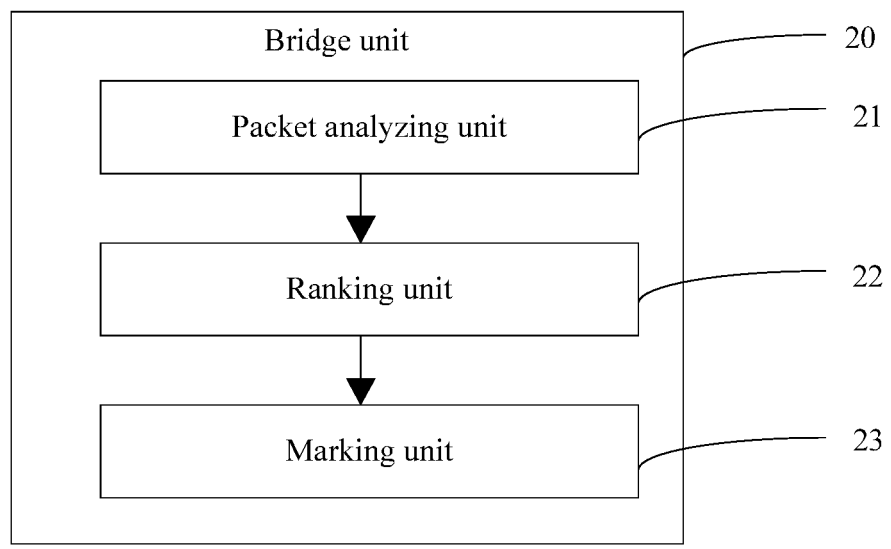
FIG. 7 is a schematic structural diagram 2 of a bridge unit according to an embodiment of the present disclosure.

Optionally, as shown in FIG. 7, the bridge unit 20 may include a packet analyzing unit 21 configured to identify the service type of the network packet according to a source port number or a destination port number of the network packet, a ranking unit 22 configured to determine the priority of the network packet according to the service type of the network packet and a preset rule, and a marking unit 23 configured to set, for the network packet, a priority mark corresponding to the priority of the network packet.

Optionally, the marking unit 23 may be further configured to set a differentiated services code point in a type of service identifier byte in a datagram of the network packet, where a value range that is of a code value of a differentiated services code point and corresponds to a priority is preset, and a value range within which a code value of the differentiated services code point falls determines the priority of the network packet.

Optionally, a network interface corresponding to the priority of the network packet is preset, and the priority of the network packet includes at least two priorities, and each priority corresponds to one or more network interfaces.

Optionally, the binding unit 30 may be further configured to identify the priority of the network packet according to the differentiated services code point in the type of service identifier byte in the datagram of the network packet, and send the network packet through the first network interface corresponding to the priority of the network packet.

When the first network interface corresponding to the priority of the network packet is faulty, the binding unit 30 is further configured to, if the priority of the network packet further corresponds to a second network interface, send the network packet through the second network interface, or if the priority of the network packet corresponds to only the first network interface, or all network interfaces corresponding to the priority of the network packet are faulty, send the network packet through a third network interface, where a priority corresponding to the third network interface is lower than the priority of the network packet.

In addition, when the first network interface corresponding to the priority of the network packet is faulty and the priority of the network packet is a lowest priority, the binding unit 30 is further configured to, if the priority of the network packet further corresponds to a fourth network interface, send the network packet through the fourth network interface, or if the priority of the network packet corresponds to only the first network interface, or all network interfaces corresponding to the priority of the network packet are faulty, send the network packet through a fifth network interface, where a priority corresponding to the fifth network interface is higher than the priority of the network packet.

According to the network device provided in this embodiment of the present disclosure, a network packet is acquired first, then a service type of the network packet is identified according to a source port number or a destination port number of the network packet, a priority of the network packet is determined according to the service type of the network packet and a preset rule, a priority mark corresponding to the priority of the network packet is set for the network packet, and finally the network packet is sent through a first network interface corresponding to the priority of the network packet. If the first network interface corresponding to the priority of the network packet is faulty and the priority of the network packet further corresponds to a second network interface, the network packet is sent through the second network interface. If the first network interface corresponding to the priority of the network packet is faulty, and the priority of the network packet corresponds to only the first network interface or all other corresponding network interfaces except the first network interface are faulty, the network packet is sent through a third network interface, where a priority corresponding to the third network interface is lower than the priority of the network packet. If the priority of the network packet is the lowest and the corresponding first network interface is faulty, and the priority of the network packet further corresponds to a fourth network interface, the network packet is sent through the fourth network interface, or if the priority of the network packet is the lowest, and the only corresponding first network interface is faulty or all other corresponding network interfaces except the first network interface are faulty, the network packet is sent through a fifth network interface, where a priority corresponding to the fifth network interface is higher than the priority of the network packet. Priorities are differentiated for services, services with different priorities are sent through different network interfaces, which completes service load distribution, improves service quality of different services and enhances user experience satisfaction.

Figure 8:
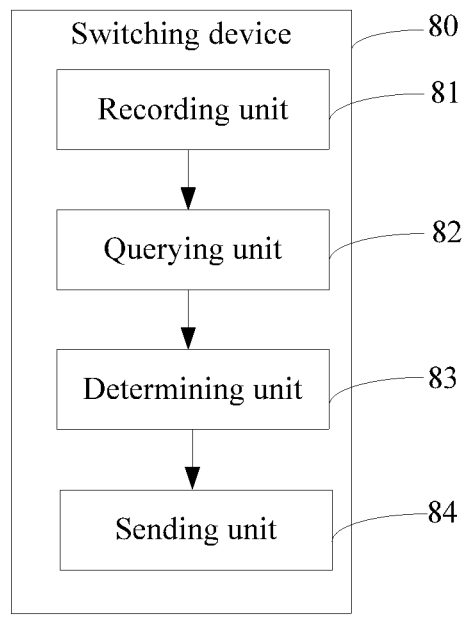
FIG. 8 is a schematic structural diagram of a switching device according to an embodiment of the present disclosure.

An embodiment of the present disclosure further provides a switching device 80, and as shown in FIG. 8, the switching device 80 includes a recording unit 81 configured to record a source port number, a source IP, a destination port number, and a destination IP of a network packet received on each physical port, a querying unit 82 configured to find, according to a source IP or a destination IP of a to-be-sent network packet, a link aggregation group that is used to send the to-be-sent network packet, a determining unit 83 configured to compare a source port number and a destination port number of the to-be-sent network packet with recorded source port numbers and destination port numbers of network packets received on all physical ports in the link aggregation group to find a physical port corresponding to the to-be-sent network packet, and a sending unit 84 configured to send the to-be-sent network packet through the corresponding physical port.

Optionally, the determining unit 83 may be further configured to compare the source port number and the destination port number of the to-be-sent network packet with the recorded source port numbers and destination port numbers of the network packets received on all the physical ports in the link aggregation group; and if the source port number of the to-be-sent network packet is the same as a destination port number of a received network packet, or the destination port number of the to-be-sent network packet is the same as a source port number of a received network packet, use a physical port that receives the network packet as the physical port corresponding to the to-be-sent network packet.

Optionally, if the physical port corresponding to the to-be-sent network packet cannot be found, the sending unit 84 is further configured to select any available physical port from the link aggregation group to send the to-be-sent network packet.

Preferably, a non-congested physical port in the link aggregation group is preferentially selected to send the to-be-sent network packet.

According to the switching device further provided in this embodiment of the present disclosure, a source port number, a source IP, a destination port number, and a destination IP of a network packet received on each physical port are recorded first. A link aggregation group that is used to send the to-be-sent network packet is found according to a source IP or a destination IP of the to-be-sent network packet. A source port number and a destination port number of the to-be-sent network packet are compared with recorded source port numbers and destination port numbers of network packets received on all physical ports in the link aggregation group. If the source port number of the to-be-sent network packet is the same as a destination port number of a received network packet, or the destination port number of the to-be-sent network packet is the same as a source port number of a received network packet, a physical port that receives the network packet is used as a physical port corresponding to the to-be-sent network packet, and the to-be-sent network packet is sent through the corresponding physical port, and if the physical port corresponding to the to-be-sent network packet cannot be found, any available physical port is selected from the link aggregation group to send the to-be-sent network packet. A physical port of a switching device that sends a network packet is selected according to a port number of the network packet, which completes service load distribution, improves service quality of different services and enhances user experience satisfaction.

It should be noted that, an implementation manner that is provided in the embodiments of the present disclosure and in which a network device is connected to a switching device is merely exemplary. The method for transmitting a network packet provided in the embodiments of the present disclosure may also be used in a scenario in which a switching device is connected to another switching device, and is also applicable to a scenario in which a network device is connected to another network device. In addition, the method for transmitting a network packet provided in the embodiments of the present disclosure is not only applicable to a scenario in which a network device is virtualized described in the embodiments of the present disclosure, but also applicable to a scenario in which a network device is not virtualized. For example, a virtual machine in the foregoing embodiments is replaced with a single server or computer, and a virtual bridge is replaced with a switch, and the method is also applicable to this scenario, and the method is the same as that in the foregoing embodiment, which is not further described.

Figure 9:
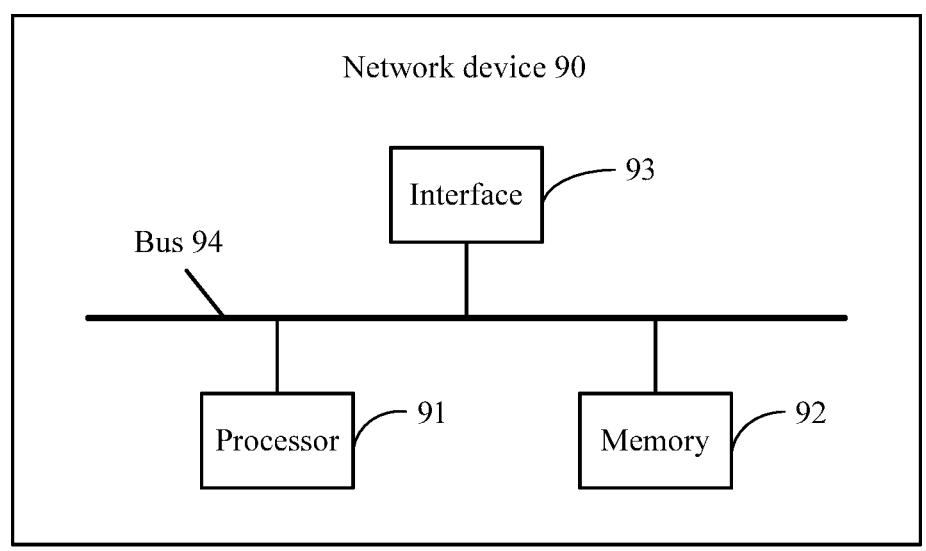
FIG. 9 is a schematic structural diagram of another network device according to an embodiment of the present disclosure.

An embodiment of the present disclosure further provides a network device 90. As shown in FIG. 9, the network device 90 includes a bus 94, a processor 91, a memory 92, and an interface 93 that are connected to the bus 94, where the interface 93 is configured to communicate, the memory 92 is configured to store an instruction, and the processor 91 executes the instruction to acquire a network packet, acquire a priority of the network packet according to a service type of the network packet, and send the network packet through a first network interface corresponding to the priority of the network packet;

Optionally, that the processor 91 executes the instruction to acquire the priority of the network packet according to the service type of the network packet may further include identifying the service type of the network packet according to a source port number or a destination port number of the network packet, determining the priority of the network packet according to the service type of the network packet and a preset rule, and setting, for the network packet, a priority mark corresponding to the priority of the network packet.

Optionally, that the processor 91 executes the instruction to set, for the network packet, the priority mark corresponding to the priority of the network packet may further include setting a differentiated services code point in a type of service identifier byte in a datagram of the network packet, where a value range that is of a code value of a differentiated services code point and corresponds to a priority is preset, and a value range within which a code value of the differentiated services code point falls determines the priority of the network packet.

Optionally, a network interface corresponding to the priority of the network packet is preset, and the priority of the network packet includes at least two priorities, and each priority corresponds to one or more network interfaces.

Optionally, that the processor 91 executes the instruction to send the network packet through the first network interface corresponding to the priority of the network packet may further include identifying the priority of the network packet according to the differentiated services code point in the type of service identifier byte in the datagram of the network packet, and sending the network packet through the first network interface corresponding to the priority of the network packet.

Optionally, when the first network interface corresponding to the priority of the network packet is faulty, the processor 91 may further execute the instruction to, if the priority of the network packet further corresponds to a second network interface, send the network packet through the second network interface, or if the priority of the network packet corresponds to only the first network interface, or all network interfaces corresponding to the priority of the network packet are faulty, send the network packet through a third network interface, where a priority corresponding to the third network interface is lower than the priority of the network packet.

Optionally, when the first network interface corresponding to the priority of the network packet is faulty and the priority of the network packet is a lowest priority, the processor 91 may further execute the instruction to, if the priority of the network packet further corresponds to a fourth network interface, send the network packet through the fourth network interface, or if the priority of the network packet corresponds to only the first network interface, or all network interfaces corresponding to the priority of the network packet are faulty, send the network packet through a fifth network interface, where a priority corresponding to the fifth network interface is higher than the priority of the network packet.

According to the network device provided in this embodiment of the present disclosure, a network packet is acquired first, then a service type of the network packet is identified according to a source port number or a destination port number of the network packet, a priority of the network packet is determined according to the service type of the network packet and a preset rule, a priority mark corresponding to the priority of the network packet is set for the network packet, and finally the network packet is sent through a first network interface corresponding to the priority of the network packet. If the first network interface corresponding to the priority of the network packet is faulty and the priority of the network packet further corresponds to a second network interface, the network packet is sent through the second network interface. If the first network interface corresponding to the priority of the network packet is faulty, and the priority of the network packet corresponds to only the first network interface or all other corresponding network interfaces except the first network interface are faulty, the network packet is sent through a third network interface, where a priority corresponding to the third network interface is lower than the priority of the network packet. If the priority of the network packet is the lowest and the corresponding first network interface is faulty, and the priority of the network packet further corresponds to a fourth network interface, the network packet is sent through the fourth network interface, or if the priority of the network packet is the lowest, and the only corresponding first network interface is faulty or all other corresponding network interfaces except the first network interface are faulty, the network packet is sent through a fifth network interface, where a priority corresponding to the fifth network interface is higher than the priority of the network packet. Priorities are differentiated for services, services with different priorities are sent through different network interfaces, which completes service load distribution, improves service quality of different services and enhances user experience satisfaction.

Figure 10:
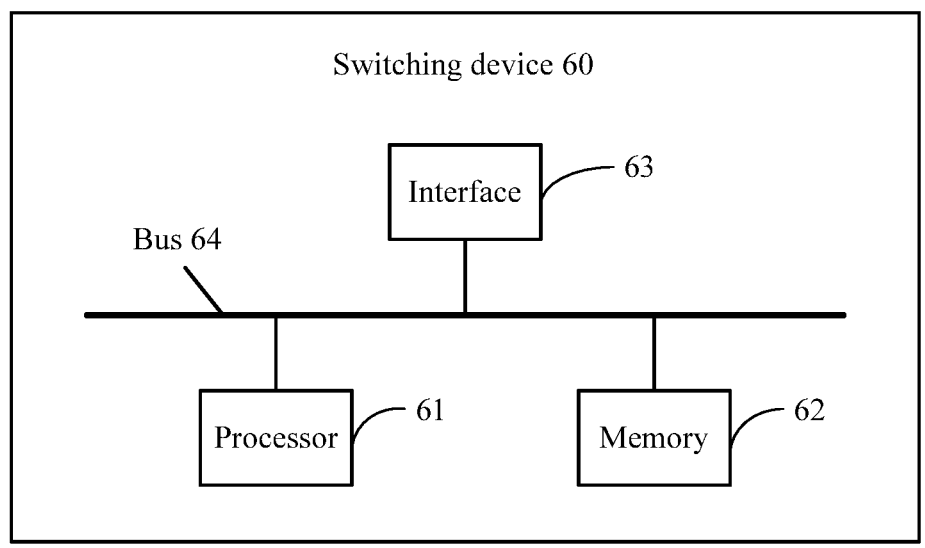
FIG. 10 is a schematic structural diagram of another switching device according to an embodiment of the present disclosure.

An embodiment of the present disclosure further provides a switching device 60. As shown in FIG. 10, the switching device 60 includes a bus 64, a processor 61, a memory 62, and an interface 63 that are connected to the bus 64, where the interface 63 is configured to communicate, the memory 62 is configured to store an instruction, and the processor 61 executes the instruction to record a source port number, a source IP, a destination port number, and a destination IP of a network packet received on each physical port; find, according to a source IP or a destination IP of a to-be-sent network packet, a link aggregation group that is used to send the to-be-sent network packet, where the link aggregation group is a group of physical ports that are connected to a same network device, compare a source port number and a destination port number of the to-be-sent network packet with recorded source port numbers and destination port numbers of network packets received on all physical ports in the link aggregation group to find a physical port corresponding to the to-be-sent network packet, and send the to-be-sent network packet through the corresponding physical port.

Optionally, that the processor 61 executes the instruction to compare the source port number and the destination port number of the to-be-sent network packet with the recorded source port numbers and destination port numbers of the network packets received on all the physical ports in the link aggregation group to find the physical port corresponding to the to-be-sent network packet may further include comparing the source port number and the destination port number of the to-be-sent network packet with the recorded source port numbers and destination port numbers of the network packets received on all the physical ports in the link aggregation group, and if the source port number of the to-be-sent network packet is the same as a destination port number of a received network packet, or the destination port number of the to-be-sent network packet is the same as a source port number of a received network packet, using a physical port that receives the network packet as the physical port corresponding to the to-be-sent network packet.

Optionally, if the physical port corresponding to the to-be-sent network packet cannot be found, the processor 61 may further execute the instruction to select any available physical port from the link aggregation group to send the to-be-sent network packet.

According to the switching device further provided in this embodiment of the present disclosure, a source port number and a destination port number of a network packet received on each port are recorded first. Then a source port number and a destination port number of a to-be-sent network packet are compared with the recorded source port number and destination port number of the network packet received on each port, if either of the source port number and the destination port number of the to-be-sent network packet is the same as either of a source port number and a destination port number of a received network packet, a port that is used to receive the network packet is used as a port corresponding to the to-be-sent network packet, and the to-be-sent network packet is sent through the corresponding physical port, and if the physical port corresponding to the to-be-sent network packet cannot be found, any available port on a switch is selected to send the to-be-sent network packet. A port of a switch that sends a network packet is selected according to a port number of the network packet, which completes service load distribution, improves service quality of different services and enhances user experience satisfaction.

It should be noted that, first, second, third, fourth, and fifth that appear in the foregoing are only used to differentiate different network interfaces, but are not intended to indicate a sequence between them.

In the several embodiments provided in the present application, it should be understood that the disclosed method and device may be implemented in other manners. For example, the described apparatus embodiment is merely exemplary. For example, the unit differentiation is merely logical function differentiation and may be other differentiation in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims

What is claimed is:

1. A method for transmitting a network packet, comprising:
    recording a source port number, a source Internet Protocol (IP), a destination port number, and a destination IP of a network packet received on each physical port;
    finding, according to a source IP of a to-be-sent network packet or a destination IP of the to-be-sent network packet, a link aggregation group that is used to send the to-be-sent network packet, wherein the link aggregation group is a group of physical ports that are connected to a same network device;
    comparing a source port number of the to-be-sent network packet and a destination port number of the to-be-sent network packet with recorded source port numbers and destination port numbers of network packets received on all physical ports in the link aggregation group;

using the physical port that receives the network packet as a physical port corresponding to the to-be-sent network packet when the source port number of the to-be-sent network packet is same as the destination port number of the received network packet or the destination port number of the to-be-sent network packet is same as the source port number of the received network packet; and sending the to-be-sent network packet through the corresponding physical port.

2. The method according to claim 1, wherein when the physical port corresponding to the to-be-sent network packet cannot be found, the method further comprises selecting any available physical port from the link aggregation group to send the to-be-sent network packet.

3. A switching device, comprising:

a processor; and a memory coupled to the processor, wherein the memory is configured to store a plurality of instructions, and wherein the instructions cause the processor to:

record a source port number, a source Internet Protocol (IP), a destination port number, and a destination IP of a network packet received on each physical port;

find, according to a source IP of a to-be-sent network packet or a destination IP of the to-be-sent network packet, a link aggregation group that is used to send the to-be-sent network packet, and wherein the link aggregation group is a group of physical ports that are connected to a same network device;

compare the source port number of the to-be-sent network packet and the destination port number of the to-be-sent network packet with recorded source port numbers and destination port numbers of network packets received on all physical ports in the link aggregation group;

use the physical port that receives the network packet as a physical port corresponding to the to-be-sent network packet when the source port number of the to-be-sent network packet is same as the destination port number of the received network packet or the destination port number of the to-be-sent network packet is same as the source port number of the received network packet; and send the to-be-sent network packet through the corresponding physical port.

4. The switching device according to claim 3, wherein when the physical port corresponding to the to-be-sent network packet cannot be found, the instructions further cause the processor to select any available physical port from the link aggregation group to send the to-be-sent network packet.

* * * * *